1,882,789

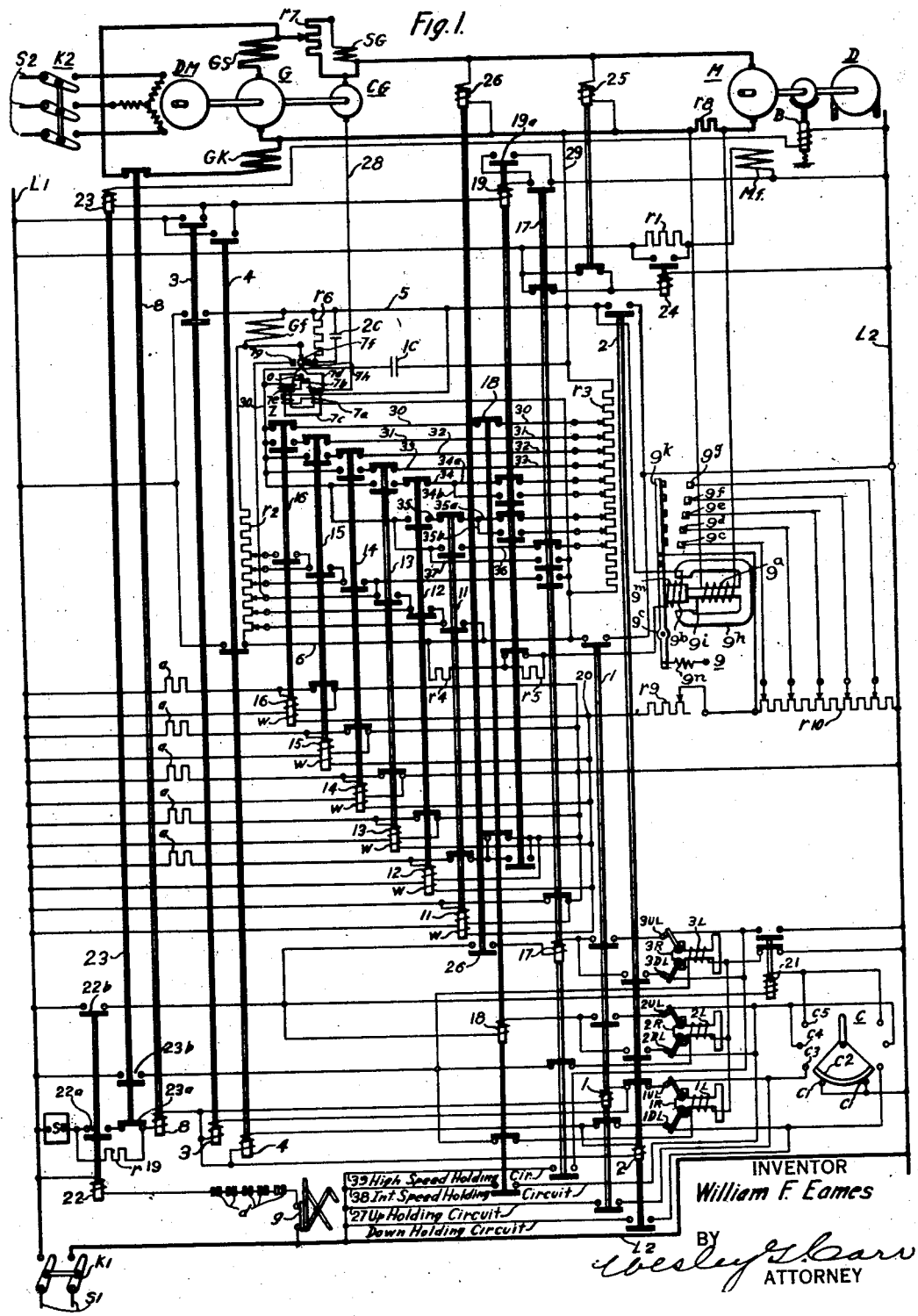

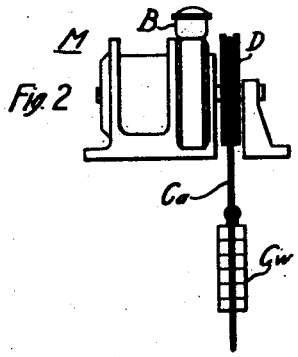
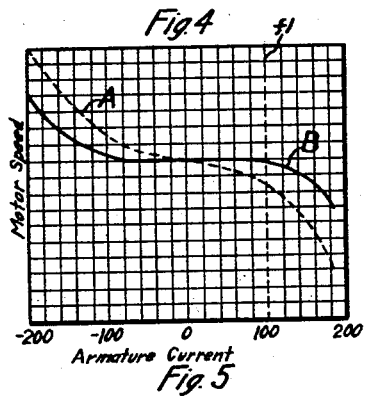
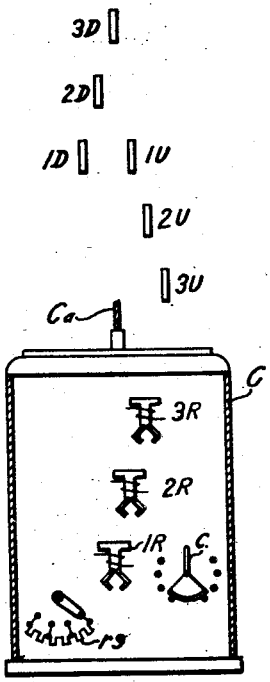
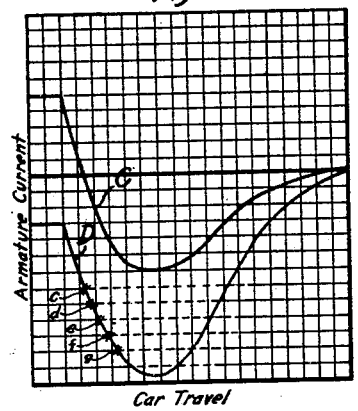
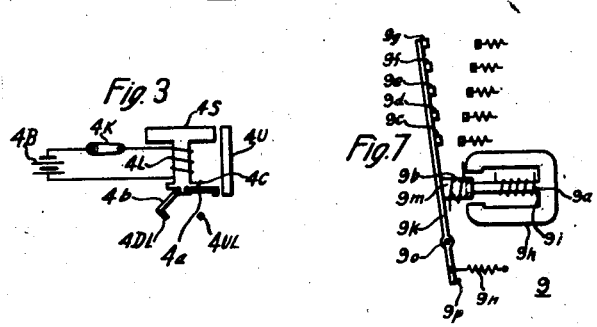
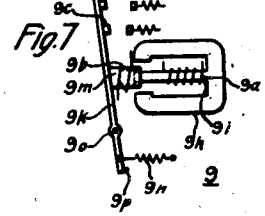
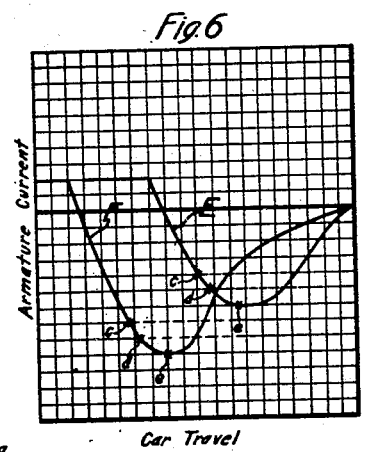
INVENTOR
William F. Eames Patented Oct. 18, 1932

UNITED STATES PATENT OFFICE

WILLIAM F. EAMES, OF EDGEWOOD, PENNSYLVANIA, ASSIGNOR TO WESTINGHOUSE ELECTRIC & MANUFACTURING COMPANY, A CORPORATION OF PENNSYLVANIA

ELEVATOR CONTROL SYSTEM

Application filed July 30, 1930. Serial No. 471,684.

My invention relates to elevator-control systems and has particular relation to elevator-control systems of the variable-voltage or Ward Leonard type.

In such systems, the armature of a separately-excited elevator motor is connected in a local circuit with the armature of a separately-excited variable-voltage generator, the speed of the motor being determined by the generator excitation. Such a system permits operation of the elevator motor at any speed within a wide range; each speed corresponding to a particular value of generator-field current, and also permits control of the rate of acceleration and deceleration of the motor, so that the elevator car may be accelerated to, and decelerated from, high speeds without discomfort to the passengers.

An elevator load is of such character that the elevator motor must be operated over a wide range of speeds with frequent starts, stops and reversals and with loads varying over a large positive and negative range, including positive and negative momentary over-loads. In order to obtain the necessary accuracy of speed control with a load of this character, it is desirable that the elevator motor be capable of operation at speeds covering a wide range of values, corresponding to car speeds ranging from low levelling speeds to high express speeds, and that the motor speed be held constant at each value over a range of loads extending well into the overload region in the positive and negative direction.

The Ward Leonard system permits operation of the motor at speeds covering the desired range but has the disadvantage that the motor speed varies somewhat with the load, falling with motoring loads and rising with overhauling or regenerative loads. The general nature of this variation is illustrated in curve A, Fig. 4 of the accompanying drawings. In this figure abscissæ represents armature current in amperes and ordinates represent motor speed for a particular value of generator-field current in a particular system. It will be noted from this curve that, for loads between 100 amperes positive or motoring and 100 amperes negative or regenerative, the curve is substantially straight or, in other words, that the variation of speed due to load is substantially proportional to load. For loads beyond this range, the variation increases disproportionately to the load. Within the range indicated above, the variation of motor speed may be approximately compensated for by some compounding arrangement for the generator, such as a cumulative series field winding of proper design. Such arrangements are known in the art, and no claim for the novelty thereof is made in this application. If the generator is equipped with a series winding of proper design, the motor speed follows such a curve, as B (Fig. 4), having a flat portion in which the motor speed is substantially independent of load. For loads beyond the range covered by this flat portion, the motor speed is not independent of load but varies with the load, as indicated in the figure.

In elevator-control systems of the automatic landing type, such as disclosed in the co-pending application of E. M. Bouton, Serial No. 731,921, filed August 14, 1924, assigned to the Westinghouse Electric & Manufacturing Company, slow down of the car is initiated at some point in advance of a floor at which the car is to stop by an inductor relay, and thereafter, the speed of the car is reduced in steps in response to the operation of other inductor relays, bringing the car to rest at the landing. In order to accomplish the operation with a Ward Leonard drive, the generator-field current is reduced in steps in response to the operation of the inductor relays, the compounding means for the generator acting to maintain the motor speed constant at the values determined by the generator-field current. As pointed out above, however, the compounding arrangements heretofore in use are capable of maintaining the motor speed constant only within a limited range of loads. In such systems, therefore, if, during slow down, the motor current rises beyond a predetermined value, the rate of deceleration of the motor is not controlled in the manner desired, and a smooth and accurate landing is not effected.

During deceleration in such systems, a heavy regenerative armature current is superposed on the armature current necessary to drive the load. This regenerative current represents the return of kinetic energy stored in the motor armature and other moving parts of the elevator system. If a motoring current is required to drive the load, as in raising the car fully loaded or in lowering it empty against the force of the counterweight, the motoring current due to the load partially offsets the regenerative current returned in decelerating the moving parts, so that the actual motor current is not excessive, the speed of the motor may be accurately controlled, and a smooth and accurate landing may be effected.

If, on the other hand, the load is overhauling, driving the motor as a generator, as in lowering the car fully loaded or in raising the car empty, with the assistance of the counterweight, the regenerative current from the load adds to the regenerative current due to deceleration of the moving parts, so that the motor-armature current rises to excessive values. Returning to Fig. 4, it will be seen that, under such conditions, the motor is operating along the left-hand portion of curve B, and the motor speed has a higher value than that represented by the flat portion of the curve. The rate of deceleration of the motor, with overhauling loads, is thus not sufficiently great during the initial stages of slow down, and the car may either over-run the landing or require such abrupt deceleration during the later stages of slow down as to cause discomfort to the passengers.

Returning to curve A, (Fig. 4) it will be understood that the variations of motor speed illustrated by this curve represent a composite of various effects in the Ward Leonard system, such as the IR drops in the armatures of the motor and generator; the speed regulation of the generator driving means (for example, if the generator is driven by an induction motor, the slip of the induction motor) and armature reaction of the generator and motor. Certain of these effects, such as the IR drops in the armature of the motor and generator, are proportional to the motor current and independent of the motor speed; others, such as the slip of the inductor motor, are substantially proportional to the motor current but greater at high elevator speeds than at low speeds; while others, such as armature reaction, depend upon the motor current only but are not linear functions of the motor current. In order to control the deceleration of the elevator motor during slow down, so that there will be no variation with the load and no tendency to over-run with overhauling loads, it is necessary to prevent all of the above effects from affecting the motor speed.

In my co-pending application, Serial No. 445,304, filed April 18, 1930, assigned to the Westinghouse Electric & Manufacturing Company, I have disclosed a Ward Leonard system in which the generator voltage is regulated in a manner to maintain the motor counter-electro-motive-force constant, regardless of the load. By this arrangement, all of the above mentioned effects are prevented from affecting the motor speed except such effects as may change the proportionality between the motor counter-electromotive-force and the motor speed. This proportionality is normally maintained, without special compensating devices, over a wide range of armature-current values. However, with very heavy armature currents, the motor field is weakened by armature reaction, in a well known manner, causing the motor counter-electromotive force to be less for a given motor speed than would be the case with a smaller value of armature current. If the elevator motor is decelerated by causing its counter-electromotive-force to decrease at a predetermined rate, there may thus still be some tendency for the car to over-run with overhauling loads, due to weakening of the motor field by the heavy regenerative current occurring under these conditions.

It is, accordingly, an object of my invention to provide an elevator-control system in which means are provided for controlling the excitation of the generator in accordance with the motor load to correct the motor-speed regulation at all motor loads and motor speeds, and in which additional means are provided for more accurately correcting the motor-speed regulation during deceleration of the motor with overhauling loads.

Other objects of my invention will become evident from the following detailed description, taken in conjunction with the accompanying drawings in which:

Figure 1 is an across-the-line diagram of an elevator-control system organized in accordance with the present invention.

Fig. 2 is a diagrammatic view of an elevator system showing the relation of inductor relays mounted on the car to inductor plates mounted in the hatchway, Fig. 3 is a diagram illustrating the operation of an inductor relay, Fig. 4 is a curve showing the motor-speed regulation in a Ward Leonard system, Fig. 5 is a curve illustrating values of motor-armature current ocurring in the system shown in Fig. 1 during deceleration of the motor, Fig. 6 is a curve illustrating values of motor-armature current occurring in the system shown in Fig. 1 during deceleration of the motor in completing a one-floor run and in completing a run of two floors or more, and, Fig. 7 is a diagrammatic view of a relay used in the practice of my invention.

While my invention is applicable to various forms of elevator systems, I have illustrated it as applied to a system of the manually started automatic-landing type, with Ward Leonard drive, such as disclosed in the co-pending application of E. M. Bouton, Serial No. 731,921, mentioned above. In such systems, the car is operated by an attendant on the car, who starts the car in the desired direction of travel by moving a car switch to an operating position. The car switch is held in the operating position until the car reaches a predetermined point in advance of the landing at which it is desired to stop, whereupon the attendant centers the car switch. The slow-down and stop operations are then carried out automatically by means of inductor relays mounted on the car, co-operating with inductor plates mounted in the hatchway; the car being brought to rest level with the landing without further operation on the part of the attendant. For one-floor runs, in such a system, the car switch may be moved to an operating position and then immediately centered, the various switches and inductor relays of the system carrying out the accelerating and decelerating operations without further attention on the part of the attendant.

Referring to Fig. 1 of the drawings, a direct current elevator motor M has its armature connected in a local circuit with the armature of a direct current generator G. The armature of the generator G is mounted on a common shaft with the armature of a small direction generator CG, the pair being arranged to be driven at substantially constant speed by any suitable driving means DM which I have illustrated as an induction motor. The windings of induction motor DM are arranged to be connected to a suitable alternating current source S2 by means of a switch K2. The armature of elevator motor M is mounted on a common shaft with a spring applied, electromagnetically released brake B of usual type, and a hoisting drum D. As shown in Fig. 2, the elevator car C is suspended by means of a cable Ca which passes over the drum D to a suitable counterweight Cw.

Supply conductors L1 and L2 are provided for supplying the direct current used in the control systems. The supply conductors L1 and L2 are arranged to be connected to a suitable direct current source S1 by means of a switch K1. The field winding Mf of motor M is connected to supply conductors L1 and L2 in series with a resistor $r1$. A conductor 6 is arranged to be connected to supply conductor L2 by means of a reversing switch 1, and to line conductor L1 by means of a reversing switch 4. Another conductor 5 is arranged to be connected to supply conductor L2 by means of a reversing switch 2 or to supply conductor L1 by means of a reversing switch 3.

The control circuits through which the reversal of current necessary for reversal of the direction of motor rotation is effected are connected in parallel between the conductors 5 and 6. These circuits are (1) a circuit including the main field winding Gf of generator G and a resistor $r2$; (2) a circuit including the stationary windings 7a of a regulator 7 (to be hereinafter more fully described); (3) a circuit including a potentiometer resistor $r3$, and (4) a circuit including the moving coil 9b of a relay 9 (to be hereinafter more fully described) and a pair of resistors $r4$ and $r5$.

The regulator 7 which I prefer to use in the practice of my invention is of the moving coil type disclosed in the co-pending application of Walter Schaelchlin Serial No. 456,330, filed May 28, 1930 and assigned to the Westinghouse Electric and Manufacturing Company. This regulator consists of a magnetic structure 7c upon which is mounted a pair of stationary windings 7a, and a movable armature 7d of non-magnetic material. The movable armature 7d is pivoted at O and carries a pair of cylinders 7e, of non-magnetic material, and a movable contact member 7f. A winding 7b is mounted on each of the cylinders 7e, the windings 7b being in inductive relation to the stationary windings 7a through the magnetic structure 7c. The movable contact member 7f is arranged to engage a stationary contact member 7g in one position of the armature 7d or to engage a second stationary contact member 7h in a second position of the armature; the space between the contact members 7g and 7h being sufficient to permit the movable contact member 7f to assume a neutral position in which neither stationary contact member is engaged. The two statonary coils 7a are connected in series in one circuit and the two moving coils 7b are connected in series in another circuit; the coils 7a and 7b being wound in such relative direction that when a current is flowing in the stationary coils 7a, the movable contact member 7f stands in neutral position if no current is flowing in the moving coils 7b, but engages one or the other of the stationary contact members 7g or 7h if a current is flowing in the moving coils, depending upon the direction of this current.

The contact members 7f, 7g and 7h are so connected in the external circuit that when movable contact member 7f engages stationary contact member 7g, a portion of resistor $r2$ in series with the main field winding Gf of generator G is short circuited, increasing the generator excitation, and when movable contact member 7f engages stationary contact member 7h, a resistor $r5$ is connected in parallel with the field winding G$f$, reducing the generator excitation. The resistance of resistors $r2$ and $r6$ is so related to the inductance of field winding G$f$ and the voltage between supply conductors L1 and L2 that the generator voltage may be varied rapidly by the action of regulator 7 at any point in the working range.

The correction generator CG is provided with a field winding SG, connected in parallel with an adjustable shunt $r7$ in the common armature circuit of the main generator G and elevator motor M. The current in the field winding SG is thus always proportional to the armature current of motor M. The shunt $r7$ is so adjusted that the voltage generated by correction generator CG, when the system is in operation, is always equal to the IR drop in the armature of motor M.

In addition to the main field winding G$f$, the generator G is provided with a cumulative series field winding GS and a suicide winding GK. The series field winding GS is permanently connected in the common armature circuit of generator G and motor M and is designed to change the voltage of generator G a proper amount, depending upon the motor current, to maintain the speed of motor M approximately constant, regardless of load, within the range between full motoring load and full regenerative load. The suicide winding GK is arranged to be connected across the terminals of generator G by a switch 8 when all of the reversing switches 1, 2, 3 and 4 are open.

The stationary coil 9$a$ of relay 9 is connected parallel with a shunt $r8$ in the common armature circuit of main generator G and elevator motor M. The current in the stationary coil 9$a$, when the system is in operation, is thus always proportional to the armature current of motor M.

The moving coils 7$b$ of regulator 7 are connected in a circuit which may be traced from the upper armature terminal of motor M, through the armature of correction generator CG, conductor 28, the moving coils 7$b$, through a conductor 30, a portion of potentiometer resistor $r3$, and conductor 29 to the lower armature terminal of motor M. The relative direction of voltages around this circuit, when the system is in operation, is such that the counter-electromotive force of motor M opposes the voltage across the portion of the potentiometer resistor included between the conductors 5 and 30. The counter-electromotive force of motor M is measured by the terminal voltage of motor M plus or minus the voltage of correction generator CG, depending upon the direction of armature current. It will be recalled that the voltage of correction generator G is at all times equal to the IR drop in the armature of motor M. With the movable coils 7$b$ of regulator 7 connected as described above, the movable contact member 7$f$ of the regulator 7 stands in neutral position when the counter-electromotive force of motor M equals the voltage between conductors 5 and 30. When the counter-electromotive force of motor M exceeds the voltage between conductors 5 and 30, the movable contact member 7$f$ engages the stationary contact member 7$h$, reducing the excitation of generator G. When the counter-electromotive force of motor M is less than the voltage between conductors 5 and 30, the movable contact member 7$f$ engages the stationary contact member 7$g$ increasing the excitation of generator G.

A set of time element relays 11, 12, 13, 14, 15 and 16 is provided for decelerating the motor smoothly in bringing the car to rest at a landing. The time element relays are arranged upon operation to transfer the connection of moving coils 7$b$ of regulator 7 from point to point along the potentiometer resistor $r3$, thereby changing the voltage in the regulator circuit which is balanced against the counter-electromotive force of M. Each of the time element relays 11 to 16 inclusive, in closing, also short circuits a section of resistor $r2$ in series with the main field winding G$f$ of generator G.

The operating coil of each time element relay 11 to 16 inclusive is connected to supply conductors L1 and L2 in a separate circuit which includes a resistor $a$. A section of each of these circuits including the operating coil of the relay but not the resistor $a$, is normally short-circuited by contact members for controlling the relay. The operating coil, therefore, normally carries no current. Upon removal of the short circuit, however, the current in the operating coil builds up rapidly because of the presence of resistor $a$, and the relay closes without substantial time delay. Upon re-establishment of the short circut, the operating coil discharges through a local circuit of relatively low resistance and the discharge current maintains the relay closed for a predetermined time interval, after which the relay opens. The relays 11 to 16 inclusive thus close substantially instantaneously but are delayed in opening.

The relay 11 is controlled by contact members of a high speed switch 17. The relay 12 is controlled jointly by contact members of relay 11, an intermediate speed switch 18 and a relay 19. The relay 19 is controlled by contact members of high speed switch 17, and is arranged to give a different decelerating action in the system for one floor runs and for runs of two or more floors.

The time element relays 13, 14, 15 and 16 are each controlled by contact members of the relay next preceding it in closing sequence. Each of the time element relays 11 to 16 inclusive, in addition to its operating coil, is provided with a de-magnetizing coil $w$. The de-magnetizing coils $w$ are connected in a circuit extending from supply conductor L1, through the coils $w$ in parallel to junction point 20, thence through a rheostat $r9$ and a resistor $r10$ to supply conductor L2.

Each of the de-magnetizing coils $w$ produces a flux in opposition to the flux produced by the operating coil of the respective relay and of approximately sufficient value to overcome the residual magnetism of the relay. By changing the resistance of rheostat $r9$ and resistor $r10$, therefore, the flux produced by the de-magnetizing coils $w$ may be changed, thereby changing the value of flux, produced by the operating coils, necessary to operate the relays, hence changing the time elements of the relays.

While for simplicity I have shown only six time element relays 11 to 16 inclusive, it will be understood that in practice a larger number may be used, depending upon the number of steps in which it is desired to decelerate the motor.

The rheostat $r9$ is preferably mounted on the car as is shown in Fig. 2 to permit simultaneous adjustment of the time elements of relays 11 to 16 inclusive from the car.

The relay 9 is of the moving coil type disclosed in the copending application of Walter Schaelchlin, Serial No. 221,422, filed Sept. 23, 1927, assigned to the Westinghouse Electric and Manufacturing Company. The construction and operation of relay 9 may best be understood by reference to Fig. 7 which shows such a relay diagrammatically. Referring to Fig. 7, the relay 9 comprises a magnetic structure $9h$ having a core $9i$ and movable armature $9k$ is pivoted at $9o$ and carries a cylinder $9m$ of non-magnetic material and a movable contact member of each of a plurality of sets of contact members $9c, 9d, 9e, 9f$ and $9g$. A stationary coil $9a$ is mounted on the core $9i$. A moving coil $9b$ is mounted on the cylinder $9m$ in inductive relation to the stationary coil $9a$ through the magnetic structure $9h$. The stationary contact members of each of the sets of contact member $9c, 9d, 9e, 9f$ and $9g$ are resiliently supported by any suitable means. The movable armature $9k$ is biased by a spring $9n$ to engage a stop $9p$ so positioned that the sets of contact members $9c, 9d, 9e, 9f$ and $9g$ are normally maintained in open position. As previously mentioned, the stationary coil $9a$ is connected in parallel with a shunt $r8$ in series with the armatures of motor M and generator G, so that the current in the stationary coil is at all times proportional to the motor armature current. The moving coil $9b$ is connected to supply conductors 5 and 6 in such direction that when the system is in operation, the force due to the reaction of the current in the moving coil $9b$ acting upon the flux due to the current in stationary coil $9a$ tends to move the armature $9k$ clockwise, or in a direction to close the several sets of contact members, when the motor armature current is regenerative and to move it counterclockwise when the motor armature current is positive or motoring. As counterclockwise movement of the armature $9k$ is prevented by the stop $9p$, the relay 9 responds to regenerative currents only. The sets of contact members $9c, 9d, 9e, 9f$ and $9g$ are arranged to close at different values of regenerative current. Returning to Fig. 1, each set of contact members $9c, 9d, 9e, 9f$ and $9g$ is arranged in closing to short-circuit a section of resistor $r10$, thereby decreasing the time elements of all of the relays 11, 12, 13, 14, 15 and 16.

A car switch C is arranged, in its first operating position for the up direction of car travel, to complete an energizing circuit for the operating coils of reversing switches 1 and 3 and switch 8; and in its first operating position for the down direction of car travel, to complete an energizing circuit for the operating coils of reversing switches 2 and 4 and switch 8. The car switch C, in its second and third positions for either direction of car travel completes energizing circuits for the intermediate speed switch 18 and a relay 21, respectively. The relay 21 controls the circuit of high speed switch 17 and the circuits of the operating coils 1L, 2L and 3L of a set of inductor relays 1R, 2R and 3R.

The set of inductor relays 1R, 2R and 3R is mounted on the car, as shown in Fig. 2, in a position to cooperate with sets of inductor plates 1D, 2D, 3D, 1U, 2U and 3U mounted in the hatchway. One complete set of inductor plates is provided for each floor except the top and bottom floors. A set corresponding to inductor plates 1U, 2U and 3U is provided for the top floor, and a set corresponding to inductor plates 1D, 2D and 3D is provided for the bottom floor.

The inductor relays which I prefer to use, in the practice of my invention, are of the type disclosed in a co-pending application of Harold W. Williams, Serial No. 279,711, filed May 22, 1928, and assigned to the Westinghouse Electric and Manufacturing Company. The construction of these relays may best be understood by reference to Fig. 3, which shows such a relay, diagrammatically. The relay consists of a magnetic structure $4s$ upon which is pivoted a pair of armatures $4a$ and $4b$ of magnetic material. The magnetic structure is provided with a pair of small lugs $4c$ of magnetic material with which the armatures $4a$ and $4b$ may engage when moved to a position to open the relay contact members. A winding $4L$ is mounted on a central core portion of the magnetic structure $4s$. Each of the armatures $4a$ and $4b$ carries a movable contact member adapted to engage a stationary contact member in one position of the armature. The armatures 4a and 4b are biased by any suitable means to a position in which their respective contact members 4UL and 4DL are closed. From inspection of Fig. 3 it will be seen that the magnetic structure 4S and armature 4a and 4b constitute a divided magnetic circuit, the winding 4L surrounding the common portion of both branches, and each of the armatures 4a and 4b composing parts of separate branches. Each branch of the magnetic circuit is normally incomplete because of the large air gap between the upper portion of the magnetic structure 4s and the free ends of the armatures. The operation of such a relay is as follows. Upon energization of the relay winding 4L, as by closure of switch 4k connecting the winding to a battery 4B, a magnetomotive force is impressed on the magnetic structure 4S, but the contact members 4UL and 4DL remain closed as the air gaps in the magnetic circuit prevent the flux in the armatures 4a and 4b from reaching a value sufficient to move the armatures against their bias. When the relay arrives at a position adjacent an inductor plate such as 4U, (Fig. 3), the inductor plate completes a branch of the magnetic circuit through armature 4a, causing the latter armature to move to the position shown, opening contact members 4UL. Upon movement of armature 4a to the position shown, the armature 4a engages the lug 4c, causing the armature to stick by magnetic attraction in the position shown, with contact members 4UL open. If the relay now moves beyond the inductor plate 4U, the contact members 4UL remain open until the circuit of the winding 4L is broken by the opening of switch 4k. If in the meanwhile, the relay passes a second inductor plate in a position to complete a magnetic circuit for the armature 4b, the contact members 4DL are opened, remaining open until the coil 4L is deenergized. Upon opening of the switch 4k, both armatures 4a and 4b are released, closing contact members 4UL and 4DL. If the relay passes other inductor plates while the switch 4k is open, the armatures 4a and 4b are not operated, as no flux is present in the magnetic structure 4s, the contact members 4UL and 4DL remaining closed.

A door relay 22, having its operating coil connected to supply conductors L1 and L2 in series with the usual door contact members d and gate contact members g, is provided for preventing starting of the car if a hatchway door or the car gate is open and for preventing operation of the car at high or intermediate speed, while a door or gate is open.

A brake relay 23 is provided for preventing starting of the car while the brake is applied and for controlling the inductor relays 1R, 2R and 3R in a manner to be hereinafter more fully described.

A relay 24 is provided for short-circuiting the resistor $r1$ in series with the motor field winding $Mf$ at all times except when the high speed switch 17 is closed, and when the voltage of main generator G exceeds a predetermined value. The relay 24 is controlled jointly by contact members of high speed switch 17 and contact members of a voltage responsive relay 25.

A second voltage responsive relay 26 is provided for preventing closure of the high speed switch 17 until the voltage of generator G has built up to a predetermined value.

A condenser $1c$ is connected in parallel with the portion of potentiometer resistor $r3$ included in the regulator circuit, to prevent abrupt changes of voltage in the regulator circuit while the connection of regulator coils $7b$ is being transferred from point to point along the potentiometer resistor by the operation of relays 11 to 16 inclusive.

A condenser $2c$ is connected in parallel with the resistor $r6$ to momentarily absorb the inductive discharge of field winding $Gf$ upon engagement of regulator contact members $7f$ and $7h$, thereby increasing the speed of response of the generator field to the action of regulator 7.

The operation of the above-described apparatus may be set forth as follows:

Preliminary to operation of the car, the switches K1 and K2 are closed. Upon closure of the switch K2, the induction motor DM is connected to the alternating current supply S2 and accelerates to its running speed, bringing the main generator G and auxiliary generator CG up to speed also. Upon closure of the switch K1, the supply conductors L1 and L2 are connected to the direct current source S1. Upon energization of supply conductors L1 and L2, a circuit for the field winding $Mf$ of the motor M is completed as follows; from supply conductor L1 through resistor $r1$, the motor field winding $Mf$ to supply conductor L2. A circuit for the operating coil of relay 24 is also completed. This circuit extends from supply conductor L1, through contact members of relay 25 and high speed switch 17 in parallel, thence through the operating coil of relay 24 to supply conductor L2. Relay 24 closes, short circuiting the resistor $r1$ and causing the current in the motor field winding $Mf$ to build up to its maximum value. If the door contact members $d$ and gate contact members $g$ are closed, a circuit for the door relay 22 is completed and the door relay 22 closes, closing its contact members 22—a in the circuit of reversing switch 1, 2, 3 and 4, and closing its contact members 22b in the circuits of high and intermediate speed switches 17 and 18 and relay 21.

The operation of the car may now be controlled by the car switch C. Assuming that the car is standing at the first floor, and that it is desired to move the car upward, to the third floor, the operator moves the handle of car-switch C to the right. When contact segment C2 of the car switch bridges contact members C1 and C3, a circuit for the operating coils of reversing switches 1 and 3 and switch 8 is completed. This circuit extends from supply conductor L2 through contact members C1, C2 and C3 of the car switch C, contact members 1UL of inductor relay 1L, interlock contact members of reversing switch 2, thence in parallel through the operating coils of reversing switches 1 and 3, through the operating coil of switch 8, contact members 23a of brake relay 23, contact members 22a of door relay 22, thence through the safety devices, shown collectively at S to supply conductor L1.

Reversing switches 1 and 3 close and switch 8 operates to open its contact members. Reversing switch 1 in closing establishes a holding circuit for itself and for reversing switch 3 and switch 8; opens interlock contact members in the circuit of reversing switches 2 and 4; partially completes the closing circuit of intermediate speed switch 18; partially completes the closing circuit for high speed switch 17; and connects conductor 6 to supply conductor L2. The holding circuit for reversing switches 1 and 3 and switch 8 extends from the horizontal portion of supply conductor L2, (near the bottom of Fig. 1), through the conductor 27, contact members of reversing switch 1, contact members 1UL of inductor relay 1R, interlock contact members of reversing switch 2, thence in parallel through the operating coils of reversing switches 1 and 3, through the operating coil of switch 8, contact members of brake relay 23, contact members 22a of door relay 22, and the safety devices S to supply conductor L1.

Reversing switch 3 in closing partially completes a circuit for relay 19; completes a circuit for the release coil of brake B and the operating coil of brake relay 23, and connects conductor 5 to supply conductor L1. The circuit for the release coil of brake B and brake relay 23 extends from supply conductor L2 (top of Fig. 1) through the release coil of brake B, through the operating coil of brake relay 23, thence through contact members of reversing switch 3 to supply conductor L1.

Switch 8 in operating breaks the connection of suicide winding GK of generator G.

The brake is released, and brake relay 23 closes. The brake relay 23 in closing, opens its contact members 23a inserting resistor r19 in the circuit of reversing switches 1 and 3 and switch 8, and closes its contact members 23b, momentarily completing a circuit for the windings 1L, 2L and 3L of inductor relays 1R, 2R and 3R, respectively. The insertion of resistor r9 in the circuit of the operating coils of reversing switches 1 and 3 and switch 8, reduces the current in this circuit to a value sufficient to maintain the switches closed but not sufficient to close the switches if they had not already been closed.

The connection of conductor 5 to supply conductor L1 by the closure of reversing switch 3 and the connection of conductor 6 to supply conductor L2 by the closure of reversing switch 1 energizes the four circuits included in parallel between the conductors 5 and 6. These circuits are, as heretofore mentioned, (1) a circuit including the main field winding Gf of generator G and a resistor r2; (2) a circuit including the stationary winding 7a of regulator 7, (3) a circuit including the potentiometer resistor r3 and (4) a circuit including the moving coil 9b of relay 9 and resistors r4 and r5.

A current of low value now flows in the circuit of the main generator field winding Gf and the generator G generates a low voltage, causing a current to flow in the common armature circuit of generator G and motor M and causing the motor M to exert a torque. The correction generator CG is now excited in proportion to the armature current of motor M and develops a voltage equal to the IR drop in the armature of motor M. This voltage acts in such a direction in the circuit of the regulator coils 7b, that the voltage between the conductors 28 and 29 in this circuit is equal to the motor terminal voltage minus the motor armature IR drop, or in other words, is equal to the counter-electromotive force of motor M. While the motor M is at rest, its counter-electromotive force is zero, so that the voltage across the portion of potentiometer resistor r3 included between the conductor 30 and the conductor 5 acts unopposed to cause a current to flow in the moving coil 7b of regulator 7. This current is in the proper direction to cause the movable contact member 7f of the regulator to engage the stationary contact member 7g, thereby short-circuiting a portion of resistor r2. This causes the voltage of generator G to build up rapidly, the armature current and torque of motor M increasing, thereby causing the motor M to accelerate. As the speed of motor M increases, its counter-electromotive force increases proportionally, introducing a voltage in the circuit of regulator coils 7b in opposition to the voltage between conductors 5 and 30, due to the potentiometer resistor r3. When the counter-electromotive force of motor M becomes equal to the voltage between conductors 5 and 30, the current in the coils 7b of regulator 7 falls to zero and movable contact member 7f disengages stationary contact member 7g, thereby re-inserting the portion of resistor r2 which had been short-circuited. The voltage of generator G now decreases, the armature current, torque, speed and counter-electromotive force of motor M falling until the counter-electromotive force of motor M becomes less than the voltage between conductors 5 and 30, whereupon the movable contact member 7f re-engages the stationary contact member 7g. The movable contact member 7f thus vibrates into and out of engagement with stationary contact member 7g, maintaining the voltage of generator G at such a value that the counter-electromotive force and speed of motor M are maintained at substantially constant values. If the load on motor M changes, the regulator 7 acts to change the voltage of generator G a sufficient amount to maintain the speed of motor M at the constant value mentioned above.

If the handle of car switch C is moved further to the right to its next operating position, contact segment C2 of the manual controller bridges contact members C1 and C4 completing an energizing circuit for the operating coil of intermediate speed switch 18. This circuit extends from supply conductor L2, through contact members C1, C2 and C4 of manual controller C, contact members 2UL of inductor relay 2R, contact members of reversing switch 1, through the operating coil of intermediate speed switch 18 and contact members 22b of door relay 22 to supply conductor L1.

Intermediate switch 18 closes, opening contact members in the circuit of winding 1L of inductor relay 1R; establishing a holding circuit for itself; removing a short circuit from the operating coil of time element relay 12 and opening contact members in series with conductor 30. The holding circuit for intermediate speed switch 18 extends from the horizontal portion of supply conductor L2 (near the bottom of Fig. 1) through conductor 38, contact members of intermediate switch 18, contact members 2UL of inductor relay 2R, contact members of reversing switch 1, the operating coil of intermediate speed switch 18, thence through contact members 22b of door relay 22 to supply conductor L1.

Upon removal of the short circuit around the operating coil of relay 12, the current in the operating coil of relay 12 builds up rapidly because of the resistor $a$ in series therewith and the relay closes without substantial time delay. Relay 12 in closing, removes a short circuit from the operating coil of relay 13; short circuits a section of resistor $r2$; completes a connection between the moving coils 7b and the potentiometer resistor $r3$ through conductors 35 and 35a; and opens contact members in series with conductor 34. It will be noted that by the closure of intermediate switch 18 and relay 12, the connection between the moving coils 7b of regulator 7 and the potentiometer resistor $r3$ through the conductor 30 has been broken and a second connection established through conductors 35 and 35a.

Upon removal of the short circuit around the operating coil of relay 13, the latter relay closes without substantial time delay. Relay 13 in closing removes a short circuit from the operating coil of relay 14; short circuits a section of resistor $r2$; opens contact members in series with conductor 33 and closes contact members in series with conductor 34. Closure of the latter contact members has no immediate effect, as contact member of relay 12 in series with conductor 34 are open at this time.

Upon removal of the short-circuit around the operating coil of relay 14, the latter relay closes without substantial time delay. Relay 14 in closing removes a short circuit from the operating coil of relay 15; short circuits a section of resistor $r2$; opens contact members in series with conductor 32; and closes contact members in series with conductor 33. Closure of the latter contact members has no immediate effect as contact members of relay 13 in series with conductor 33 are open at this time.

Upon removal of the short-circuit around the operating coil of relay 15, the latter relay closes without substantial time delay. Relay 15, in closing, removes a short circuit around the operating coil of relay 16; short circuits a section of resistor $r2$; opens contact members in series with conductor 31 and closes contact members in series with conductor 32. Closure of the latter contact members has no immediate effect, as contact members of relay 14 in series with conductor 32 are open at this time.

Upon removal of the short-circuit around the operating coil of relay 16, the latter relay closes without substantial time delay. Relay 16 in closing, short circuits a section of resistor $r2$; closes contact members in series with conductor 31; and opens contact members in series with conductor 30. The last two operations performed by relay 16 have no immediate effect, as contact members of relay 15 in series with conductor 31 and contact members of intermediate switch 18, in series with conductor 30, are open at this time.

It will be noted that the closure of intermediate speed switch 18, and of relay 12 to 16 seriatim, as described above, transfers the connection of movable coils 7b of regulator 7 from the conductor 30 to the conductor 35b, in a single step, thus increasing the voltage balanced against the motor-counter-electromotive force in the regulator circuit, and also short circuits sections of resistor $r2$. The increase of voltage in the regulator circuit causes a current to flow in the movable coils 7b of regulator 7 in the proper direction to cause movable contact member 7f to engage stationary contact member 7g, thereby short-circuiting a section of resistor $r2$. The voltage of generator G now builds up rapidly, the armature current, torque, speed and counter-electromotive force of motor M increasing until the counter-electromotive force of motor M becomes equal to the voltage between conductors 5 and $35a$. When this occurs, movable contact member $7f$ of regulator 7 dis-engages stationary contact member $7g$, re-inserting the section of resistor $r2$. The regulator 7 now vibrates in the manner previously described, maintaining the speed of motor M constant at intermediate speed value.

In the meanwhile, as the voltage of generator G increases, it attains a value, somewhat below the value for operation of motor M at intermediate speed, at which the relay 26 is designed to close. The relay 26 closes, partially completing the circuit of the operating coil of high speed switch 17.

If the handle of car switch C is moved further to the right to its last operating position, contact segment C2 bridges contact members C1 and C5, completing an energizing circuit for the operating coil of relay 21. This circuit extends from supply conductor L2, through contact members C1, C2 and C5 of car switch C, the operating coil of relay 21, and contact members $22b$ of door relay 22 to supply conductor L1.

Relay 21 closes, opening contact members in the circuit of the coil 1L, 2L and 3L of inductor relays 1R, 2R and 3R, respectively, and completing a circuit for the operating coil of high speed switch 17. This circuit extends from supply conductor L2, through contact members of relay 21, contact members 3UL of inductor relay 3R, contact members of reversing switch 1, the operating coil of high speed switch 17, contact members of voltage responsive relay 26, thence through contact members $22b$ of door relay 22 to supply conductor L1.

High speed switch 17 closes, opening contact members in the circuit of coil 2L of inductor relay 2R, establishing a holding circuit for itself; completing an energizing circuit for the operating coil of relay 19; removing a short-circuit from the operating coil of relay 11; short-circuiting a section of resistor $r2$; closing contact members in series with conductor 37; opening contact members in series with conductor 36; and opening contact members in the circuit of relay 24.

The holding circuit for high speed switch 17 extends from the horizontal portion of supply conductor L2 (near the bottom of Fig. 1) through conductor 39, contact members of high speed switch 17, contact members 3UL of inductor relay 3R, contact members of reversing switch 1, the operating coil of high speed switch 17, contact members of relay 26, and contact members $22b$ of door relay 22 to supply conductor L1.

The circuit for the operating coil of relay 19, (completed by closure of high speed switch 17) extends from supply conductor L2, through contact members of high speed switch 17, through the operating coil of relay 19 and contact members of reversing switch 3 to supply conductor L1.

Relays 19 and 11 close. Relay 19, in closing, establishes a holding circuit for itself independent of high speed switch 17 by closure of its contact members $19a$; establishes a short circuit for the operating coil of relay 12; removes the short circuit around resistor $r5$; opens contact members in series with conductors $35a$ and $34a$ and closes contact members in series with conductors $35b$ and $34b$. Relay 11, in closing, opens the short circuit around the operating coil of relay 12 momentarily established by relay 19; short-circuits a section of resistor $r2$; closes contact members in series with conductor 36 and opens contact members in series with conductor 35.

The momentary short-circuiting of the operating coil of relay 12 in the event that relay 19 closes before relay 11 opens, does not cause relay 12 to drop out, as the discharge current of the operating coil of relay 12 maintains the relay closed during the transition period between the closure of relays 19 and 11.

The closure of contact members of high speed switch 17 in series with conductor 37 increases the voltage balanced against the counter-electromotive force of motor M in the regulator circuit to the full voltage between conductors 5 and 6. This causes a current to flow in the movable coils $7b$ of regulator 7 in the proper direction to cause movable contact members $7f$ to engage stationary contact member $7g$, thereby short circuiting a section of resistor $r2$. The voltage of generator G now builds up rapidly, the armature current, torque, speed and counter-electromotive force of motor M increasing in the manner previously described. As the voltage of generator G builds up, it attains a value sufficient to operate the voltage responsive relay 25. Relay 25 thereupon operates to open its contact members, breaking the circuit of relay 24. Relay 24 drops out, inserting the resistor $r1$ in series with the field winding $Mf$ of Motor M, thereby reducing the excitation of motor M and causing its speed to increase. As the speed of motor M increases, its counter-electromotive force increases until it becomes equal to the voltage between the conductors 5 and 6. When this occurs, the movable contact members $7f$ of regulator 7 disengages the stationary contact member $7g$, re-inserting the section of resistor $r2$. The regulator 7 now vibrates in the manner previously described, maintaining the speed of motor M constant at high speed value.

As the car approaches a position in advance of the third floor at which the inductor relay 3R on the car would be opposite the inductor plate 3U for the third floor, the attendant centers the car switch C. Upon centering of the car switch C, the circuit of relay 21 is broken at contact member C5; the closing circuit of intermediate speed switch 18 is broken at contact member C4; and the closing circuit of reversing switches 1 and 3 and switch 8 is broken at contact member C3. Relay 21 drops out but intermediate speed switch 18 is held in through the intermediate speed holding circuit traced above, and reversing switches 1 and 3 and switch B are held in through the up-holding circuit traced above. Relay 21 in dropping out breaks the closing circuit of high speed switch 17 and completes an energizing circuit for the coil 3L of inductor relay 3R. High speed switch 17 does not drop out, as it is held in through the high speed holding circuit traced above.

Upon energization of the coil 3L of inductor relay 3R, a magnetomotive force is impressed on the magnetic structure of the relay, but the contact members 3UL and 3DL of the relay remain closed as the magnetic circuit of the relay is incomplete.

When the car reaches such a position in the hatchway that inductor relay 3R is opposite the inductor plate 3U, contact members 3UL of the inductor relay open, breaking the high speed holding circuit thereby causing high speed switch 17 to drop out. High speed switch 17 in dropping out, opens contact members in the high speed holding circuit; completes an energizing circuit for the coil 2L of inductor relay 2R; short circuits the operating coil of relay 11, removes a short circuit from a portion of resistor r2; opens contact members in series with conductor 37; closes contact members in series with conductor 36; reestablishes the energizing circuit of relay 24 and opens the closing circuit of relay 19.

Completion of the energizing circuit of coil 2L of inductor 2R does not at this time cause the opening of contact members 2UL, however, as the magnetic circuit of the inductor relay is incomplete. Relay 19 does not immediately drop out as its contact members 19a, in parallel to the contact members of high speed switch 17, maintain a holding circuit for the relay. Switch 24 closes, short-circuiting the resistor r1 in series with the field winding Mf of motor M, thereby increasing the excitation and decreasing the speed of the motor.

Upon establishment of the short-circuit around the operating coil of relay 11 by contact members of high speed switch 17, the operating coil of relay 11 discharges inductively, at a rate determined by the ratio of inductance to resistance of the coil. At the expiration of a predetermined time interval, the current in the local circuit of the operating coil decreases to a sufficient value to permit relay 11 to drop out. Relay 11 drops out, short-circuiting the operating coil of relay 12; removing a short-circuit from a portion of resistor r2; opening contact members in series with conductor 36 and closing contact members in series with conductor 35.

The establishment of the short-circuit around the operating coil of inductor relay 12 by contact members of relay 11, permits the operating coil to discharge inductively, and at the expiration of a predetermined time interval relay 12 drops out. Relay 12 in dropping out, short-circuits the operating coil of relay 13; removes a short-circuit from a portion of resistor r2; opens contact members in series with conductor 35 and closes contact members in series with conductor 34.

The establishment of the short-circuit around the operating coil of relay 13 by contact members of relay 12, permits the operating coil of relay 13 to discharge inductively. At the expiration of a predetermined time interval, relay 13 drops out. Relay 13, in dropping out, short-circuits the operating coil of relay 14; removes a short-circuit from a portion of resistor r2; opens contact members in series with conductor 34 and closes contact members in series with conductor 33.

The establishment of the short-circuit around the operating coil of relay 14 by contact members of relay 13 permits the operating coil of relay 14 to discharge inductively. At the expiration of a predetermined time interval, relay 14 drops out. Relay 14 in dropping out short-circuits the operating coil of relay 15; removes a short-circuit from a portion of resistor r2; opens contact members in series with conductor 33 and closes contact members in series with conductor 32.

The establishment of the short-circuit around the operating coil of relay 15 by contact members of relay 14 permits the operating coil of relay 15 to discharge inductively. At the expiration of a predetermined interval of time, relay 15 drops out. Relay 15, in dropping out, short-circuits the operating coil of relay 16; removes a short-circuit from a portion of resistor r2; opens contact members in series with conductor 32 and closes contact members in series with conductor 31.

The establishment of the short-circuit around the operating coil of relay 16 by contact members of relay 15 permits the operating coil of relay 16 to discharge inductively. At the expiration of a predetermined time interval, relay 16 drops out. Relay 16, in dropping out, removes a short-circuit from a portion of resistor r2; opens contact members in series with conductor 31 and closes contact members in series with conductor 30.

At some time during the opening of relays 11 to 16 inclusive, the inductor relay 2R arrives at a position opposite the inductor plate 2U for the third floor. When this occurs, contact members 2UL of the inductor relay open, breaking the holding circuit of intermediate speed switch 18. Intermediate speed switch 18 drops out, opening contact members in the intermediate speed holding circuit, closing contact members in the local circuit of relay 12 and closing contact members in series with conductor 30.

The successive dropping out of high speed switch 17 and relays 11, 12, 13, 14, 15 and 16 in the manner described above, transfers the connection of the moving coils 7b of regulator 7 successively from conductor 37 to conductors 36, 35, 34, 33, 32, 31 and 30, respectively. As each change is made, the voltage opposing the counter-electromotive force of the motor M in the regulator circuit is reduced, and movable contact member 7f of the regulator 7 engages stationary contact member 7h, thereby connecting resistor r6 in parallel with the generator field winding Gf, reducing the generator voltage until the counter-electromotive force of motor M becomes equal to the reduced voltage. When this occurs, at each step in the transition, the regulator 7 vibrates maintaining the motor counter-electromotive force at a value equal to the voltage opposing it in the regulator circuit. During the transition period, the voltage of generator G falls rapidly, the speed of motor M decreases, and the kinetic energy stored in the motor armature and moving parts of the elevator system appears as a heavy regenerative current in the common circuit of the generator and motor armatures. The maximum value of this regenerative current is generally higher than the motoring current required to drive a fully loaded car at constant speed, so that even with heavy motoring loads the current is regenerative during deceleration. This condition is illustrated in Fig. 5, in which the abscissae represents distance of car travel and the ordinates represent armature current. Curve C in this figure illustrates current values during deceleration with a motoring load and curve D illustrates current values during deceleration with an overhauling load.

If the load on the elevator car is over-hauling, as in raising the car empty with the assistance of the counterweight, the current flowing in the motor armature follows a curve such as D. This current attains overload values, and by armature reaction reduces the excitation of motor M. The reduction of the excitation of motor M changes the proportionality between the motor counter-electromotive force and the motor speed, so that the former is no longer an exact measure of the latter. The motor counter-electromotive force is now, due to the reduced excitation of the motor, less for a given motor speed than it would be for the same motor speed at no load. As the regulator 7 operates to control the motor counter-electromotive force, the speed of the motor has a tendency, during deceleration with overhauling loads, to rise somewhat above its intended value. If no means were provided to compensate for this tendency, the deceleration would not be sufficiently rapid during the initial stages of slow down and the car would over-run the landing or would require abrupt and discomforting deceleration during the last stages of slow down in order to effect an accurate stop.

However, in accordance with my invention, the relay 9 now comes into action to neutralize the tendency mentioned above. As the regenerative current in the common armature circuit of generator G and motor M rise, the force on the movable coil 9b of relay 9 increases, and when a regenerative current value corresponding to point c (Fig. 5) is attained, the contact members 9c of relay 9 close, short-circuiting a section of resistor r10. If the regenerative current continues to increase, the sets of contact members 9d, 9e, 9f and 9g close at successive values of regenerative current, each set in closing short-circuiting a section of resistor r10. The short-circuiting of sections of resistor r10 simultaneously increases the current in the demagnetizing coil w of each of the time element relays 11 to 16 inclusive. As previously explained, an increase of current in these coils shortens the time elements of the relays. Relays 11 to 16 inclusive thus drop out more rapidly with regenerative loads, the increase of speed of the relays being greater or less depending upon the value and duration of the regenerative load. By proper adjustment of resistor r9 and r10, the increase of the rate of deceleration due to the action of relay 9 may be made to exactly compensate for the tendency of motor M to decelerate at too low a rate with overhauling loads, so that the car may be decelerated uniformly regardless of the load.

As the voltage of generator G decreases, it falls below the value necessary to maintain voltage responsive relay 26 closed, and this relay drops out, opening contact members in the circuit of high speed switch 17. High speed switch 17 is at this time open so that the dropping out of relay 26 has no immediate effect.

As the car approaches the third floor, inductor relay 1R arrives at a position opposite inductor plate 1U for the third floor. When this occurs, the magnetic circuit of the inductor relay is completed and contact members 1UL of the relay open, breaking the holding circuit for reversing switches 1 and 3 and switch 8. Reversing switches 1 and 3 and switch 8 drop out.

Reversing switch 1, in dropping out, opens contact members in the up holding circuit, closes interlock contact members in the circuit of down reversing switches 2 and 4; opens contact members in the circuit of intermediate speed switch 18; opens contact members in the circuit of high speed switch 17 and disconnects conductor 6 from supply conductor L2.

Reversing switch 3, in dropping out, disconnects conductor 5 from supply conductor L1; breaks the circuit of relay 19; and breaks the common circuit of the release coil of brake B and brake relay 23. The brake B is applied and relays 19 and 23 drop out.

Switch 8, in dropping out, reconnects the suicide winding GK to the terminals of generator G, thereby reducing the voltage of generator G to zero.

Relay 19, in dropping out, opens contact members in the circuit of the operating coil of relay 12; short circuits resistor $r5$; opens contact members in series with conductor $35b$; closes contact members in series with conductor $35a$; opens contact members in series with conductor $34b$; closes contact members in series with conductor $34a$ and opens contact members $19a$ in its own holding circuit.

Brake relay 23, in dropping out, closes its contact members $23a$ in series with reversing switches 1, 2, 3 and 4 and switch 8 and opens its contact members $23b$ in series with coils 1L, 2L and 3L of inductor relays 1R, 2R and 3R, respectively.

The car is now at rest at the third floor, and the relays and switches are all restored to the positions which they had before the handle of car switch C was moved. The system is now ready for operation of the car in either direction in response to movement of the car switch C.

The operation so far described is that occurring in the system in making runs of two or more floors. For one-floor runs, a somewhat different action takes place.

For example, in making a one-floor run upward, from the first to the second floors, the attendant moves the handle of car switch C to the right as far as it will go and then immediately centers it. Reversing switches 1 and 3, switch 8 and intermediate speed switch 18 close in the manner previously described; relay 21 closes momentarily but does not complete a circuit for high speed switch 17, as the voltage of generator G has not built up to a sufficient value to close relay 26 by the time the car switch is centered. High speed switch 17, therefore, remains open as does relay 19 controlled by it.

In response to closure of reversing switch 1. the brake B is released and brake relay 23 closes in the manner previously described.

In response to closure of intermediate speed switch 18, time element relays 12 to 16 close seriation, in the manner previously described. The closure of relay 12 transfers the connection of the moving coils $7b$ of regulator 7 from conductor 30 to conductor 35, thereby bringing the speed of motor M up to intermediate speed value.

As the car approaches the second floor, no decelerating action takes place until inductor relay 2R arrives at a position adjacent inductor plate 2U for the second floor. When this occurs, contact members 2UL of the inductor relay open, breaking the holding circuit of intermediate speed switch 18. Intermediate speed switch 18 drops out, short-circuiting the operating coil of relay 12. Relays 12 to 16 now drop out seriation at predetermined time intervals, in the manner previously described, transferring the connection of the moving coils $7b$ from point to point along the resistor $r3$, thereby reducing the speed of motor M. It will be noted, however, that since relay 19 is open, the circuits through conductors $34b$ and $35b$ are open, while the circuits through conductors $34a$ and $35a$ are closed. The proportion of resistor $r3$ controlled by relays 12 and 13 is, therefore, different from the proportion of this resistor controlled by the relays in decelerating after a two-floor run.

As the motor M decelerates, a regenerative current builds up in the common armature circuit of generators G and motor M, in the manner previously described. This condition is illustrated in Fig. 6. In Fig. 6, armature current is plotted against distance of car travel as in Fig. 5, curve E representing current values occurring in decelerating after a one-floor run, and curve F representing current values occurring in decelerating after a run of two floors or more. It will be noted that the maximum value of regenerative current of curve E is less than the maximum value of regenerative current of curve F. If the relay 9 is set to close its contact members $9c$ at a regenerative current value indicated by $c$ on curve F, there will be no correction introduced by relay 9 in decelerating after a one-floor run. However, returning to Fig. 1, it will be noted that, as relay 19 is open, the resistor $r5$ is short-circuited. The current flowing through the moving coil $9b$ of relay 9 is, therefore, higher than it was in decelerating after a two-floor run. The increased current flowing in the moving coil $9b$ of relay 9 causes the relay to respond to lower values of armature current than was the case in decelerating after a two-floor run. The contact members $9c$, $9d$ and $9e$ thus close at current values $c$, $d$ and $e$ (curve E), regulating the time elements of relays 12 to 16 inclusive in the manner previously described.

As the car approaches the second floor, inductor plate 1U causes the relay to open its contact members 1UL. The reversing switches 1 and 3 now drop out, the brake B is applied, and other operations are performed, bringing the car to rest in the manner previously described.

Operation of the car in the downward direction will be obvious from the above; the handle of car switch C being moved to the left, and reversing switches 2 and 4 being closed rather than 1 and 3. The remainder of the operation is identical with that described above.

In the arrangement described above, the speed control of the motor M is obtained entirely through the regulator 7. The commutation of the resistor r2 by the relays 11 to 16 inclusive and the series field winding GS, have no direct influence on the motor speed regulation but adjust the generator excitation to approximately the value at which it will be maintained by the regulator, thereby reducing the duty of the regulator and prolonging the life of its contact members.

By adjusting the proportion of resistor r3 controlled by each of the relays 11 to 16 inclusive, the motor M may be caused to decelerate along any desired speed-time curve. By adjusting the resistor r9, the total time of deceleration may be adjusted from the car to suit conditions.

In Patent No. 1,848,773, granted March 8, 1932, on application Serial No. 428,647, filed February 15, 1930, I have disclosed a motor-control system of the variable voltage type, in which the excitation of the generator supplying the work motor is controlled by a regulator responsive to the differences of voltages of an auxiliary generator driven at variable speed and a second auxiliary generator driven by the work motor, in such manner as to eliminate the effect of load upon the speed of the work motor.

In my copending application Serial No. 428,650, filed February 15, 1930, I have disclosed a variable voltage motor-control system, in which the excitation of the generator supplying the work motor is controlled in accordance with the difference of voltages of a potentiometer controlled by a series of time element relays and an auxiliary generator driven by the work motor, in such manner as to eliminate the effect of load upon the speed of the work motor.

In my copending application Serial No. 428,648, filed February 15, 1930, I have disclosed a variable voltage motor-control system, in which the excitation of the generator supplying the work motor is controlled by means of a differential device responsive to differential rotation of the work motor and an auxiliary motor, in such a manner as to eliminate the effect of load on the speed of the work motor, and in which the speed and rate of change of speed of the auxiliary motor may be independently controlled.

In my copending application Serial No. 445,303, filed April 18, 1930, I have disclosed a variable voltage motor-control system, in which the excitation of the generator supplying the work motor is controlled in accordance with the difference between the counter-electromotive force of the work motor and the voltage of an auxiliary generator driven at constant speed, in such a manner as to eliminate the effect of load upon the speed of the work motor.

In my copending application Serial No. 445,304, filed April 18, 1930, I have disclosed a variable voltage motor-control system, in which the excitation of the generator supplying the work motor is controlled in accordance with the counter-electromotive force of the work motor, as measured by the terminal voltage of the generator corrected for armature resistance drop, in such a manner as to eliminate the effect of load upon the speed of the work motor.

In my copending application Serial No. 547,389, filed June 27, 1930, I have disclosed a variable voltage motor-control system, in which the excitation of the generator supplying the work motor is controlled in accordance with the difference between the counter-electromotive force of the work motor and the voltage of an auxiliary generator driven at variable speed, in such a manner as to eliminate the effect of load upon the speed of the work motor.

In the present application, I do not claim the control of the generator excitation broadly in accordance with a voltage proportional to the difference between the actual speed of the motor and a predetermined control speed, as this is the subject matter of my Patent No. 1,848,773 mentioned above.

I do not claim the control of the generator excitation to cause the speed of the work motor to follow a predetermined succession of values, each independent of load, nor the control of the generator excitation in accordance with a control voltage furnished by the specific means of a potentiometer, nor the control of a field forcing resistor broadly in accordance with the speed of the work motor, as this subject matter is covered in my copending application Serial No. 428,650, filed February 15, 1930, mentioned above.

In the present application, I do not claim the control of the generator excitation in accordance with the differential rotation of the work motor, as compared with an independently driven rotary element, as this subject matter is claimed in my copending application Serial No. 428,648, filed February 15, 1930, mentioned above.

In the present application, I do not claim the control of the generator excitation by means responsive to a control voltage, the terminal voltage of the motor, and a voltage proportional to the motor armature current, nor by means responsive to a control voltage and a voltage substantially equal to the counter-electromotive force of the work motor, as this subject matter is covered in my copending application Serial No. 445,303, filed April 18, 1930, mentioned above.

I do not claim the control of the generator excitation broadly by means responsive to the terminal voltage of the motor and a voltage proportional to the motor armature current, nor broadly by means responsive to a voltage substantially equal to the motor counter-electromotive force, as this subject matter is claimed in my copending application Serial No. 445,304, filed April 18, 1930, mentioned above.

I do not claim the control of the generator excitation by means responsive to the counter-electromotive force of the motor and a voltage furnished by the specific means of a control generator driven at variable speed, nor to the control of the generator excitation by means involving an auxiliary machine decelerated by the specific means of an electro-magnetic brake, as this subject matter is claimed in my copending application Serial No. 547,389, mentioned above.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In an elevator-control system, an elevator car, a motor for driving said car, means for varying the speed of said motor, means for approximately correcting the speed regulation of said motor, means operating upon said first mentioned means to control the rate of deceleration of said motor, and means responsive to the load on said motor for modifying the operation of said last mentioned means to cause the deceleration of said motor to be substantially the same with all car loads.

2. In an elevator-control system, an elevator car operable in a hatchway past a landing, means for varying the speed of said motor, means for approximately correcting the speed regulation of said motor, means responsive to the position of said car for operating upon said first mentioned means to control the rate of deceleration of said motor while the car is approaching said landing and is in a predetermined region in advance of said landing, and means responsive to the load on said motor for modifying the operation of said last mentioned means to cause the deceleration of said motor to be substantially the same with all car loads.

3. In an elevator-control system, an elevator car operable in a hatchway past a landing, a motor for driving said car, means for varying the speed of said motor, means for approximately correcting the speed regulation of said motor, means responsive to the position of said car for operating upon said first mentioned means to control the rate of deceleration of said motor while said car is approaching said landing and is in a predetermined region in advance of said landing, in order to bring said car to rest at said landing, and means responsive to the load on said motor for modifying the operation of said last-mentioned means to cause the deceleration of said motor to be substantially the same with all car loads.

4. In an elevator-control system, an elevator car operable in a hatchway past a landing, means for varying the speed of said motor, means for approximately correcting the speed regulation of said motor, manually controlled means for initiating operation of said first mentioned means to accelerate said motor, means responsive to the position of said car for operating upon said first mentioned means to control the rate of deceleration of said motor while said car is approaching said landing and is in a predetermined region in advance of said landing, in order to bring said car to rest at said landing, and means responsive to the load on said motor for modifying the operation of said last mentioned means to cause the deceleration of said motor to be substantially the same with all car loads.

5. In an elevator-control system, an elevator car, a motor for driving said car, a generator, electrical connections between the armatures of said motor and said generator, controlling means for adjusting the excitation of said generator in accordance with successive desired values of motor speed, means responsive to the current in said connections for changing the excitation of said generator to correct the variations of actual speed of said motor from values fixed by said controlling means within a predetermined range of loads, and means responsive to the load on said motor for modifying the operation of said controlling means to cause the actual speed of said motor to be maintained at said desire values regardless of motor load.

6. In an elevator-control system, an elevator car, a motor for driving said car, a generator, electrical connections between the armatures of said motor and said generator, controlling means for adjusting the excitation of said generator in accordance with successively desired values of motor speed, means responsive to the current in said connections for changing the excitation of said generator to correct the variations of actual speed of said motor from values fixed by said controlling means within a predetermined range of current values, and means responsive to current in said connections for modifying the operation of said controlling means to cause the actual speed of said motor to be maintained at said desired values, regardless of motor load.

7. In an elevator-control system, an elevator car operable in a hatchway past a landing, a motor for driving said car, a generator, electrical connections between the armatures of said motor and said generator, controlling means for adjusting the excitation of said generator in accordance with desired values of motor speed, means responsive to the current in said connections for changing the excitation of said generator to correct the variations of actual speed of said motor from values fixed by said controlling means within a predetermined range of current values, means responsive to the position of said car for operating upon said controlling means to control the rate of deceleration of said motor while the car is approaching said landing and is in a predetermined region in advance of the landing, and means responsive to the current in said connections for modifying the operation of said last-mentioned means to cause the deceleration of said motor to be substantially the same with all car loads.

8. In an elevator-control system, an elevator car operable in a hatchway past a landing, a motor for driving said car, a generator, electrical connections between the armatures of said motor and said generator, controlling means for adjusting the excitation of said generator in accordance with desired values of motor speed, means responsive to the current in said connections for changing the excitation of said generator to correct the variations of actual speed of said motor from values fixed by said controlling means within a predetermined range of current values, means responsive to the position of said car for operating upon said controlling means to control the rate of deceleration of said motor while the car is approaching said landing and is in a predetermined region in advance of the landing in order to bring the car to rest at the landing, and means responsive to current in said connections for modifying the operation of said last-mentioned means to cause the deceleration of said motor to be substantially the same with all car loads.

9. In an elevator-control system, an elevator car operable in a hatchway past a landing, a motor for driving said car, a generator, electrical connections between the armatures of said motor and said generator, controlling means for adjusting the excitation of said generator in accordance with desired values of motor speed, means responsive to the current in said connections for changing the excitation of said generator to correct the variations of actual speed of said motor from values fixed by said controlling means within a predetermined range of current values, manually controlled means for initiating operation of said controlling means to accelerate said motor, means responsive to the position of said car for operating upon said controlling means to control the rate of deceleration of said motor while the car is approaching said landing and is in a predetermined region in advance of the landing in order to bring the car to rest at the landing, and means responsive to the current in said connections for modifying the operation of said last-mentioned means to cause the deceleration of said motor to be substantially the same with all car loads.

10. In an elevator-control system, an elevator car, a motor for driving said car, means for impressing a variable voltage on the armature of said motor, controlling means operating upon said first mentioned means to vary said voltage in a manner to control the rate of change of the counter-electromotive force of said motor, and means for modifying the operation of said controlling means to correct for variations in the ratio between the counter-electromotive force and speed of said motor due to load, whereby the rate of change of speed of said motor in response to operation of said controlling means is independent of the load on said elevator car.

11. In an elevator-control system, an elevator car, a motor for driving said car, a generator, electrical connections between the armatures of said motor and said generator, controlling means for varying the excitation of said generator to control the rate of change of the counter-electromotive force of said motor and means for modifying the operation of said controlling means to correct for variations in the ratio between the counter-electromotive force and speed of said motor due to load, whereby the rate of change of speed of said motor in response to operation of said controlling means is independent of the load on said elevator car.

12. In an elevator-control system, an elevator car operable in a hatchway past a landing, a motor for driving said car, a generator, electrical connections between the armatures of said motor and said generator, controlling means for varying the excitation of said generator to control the rate of decrease of the counter-electromotive force of said motor while the car is approaching said landing and is in a predetermined region in advance of said landing, and means for modifying the operation of said controlling means to correct for variations in the ratio between the counter-electromotive force and speed of said motor due to load, whereby the rate of deceleration of said motor in response to operation of said controlling means is independent of the load on said elevator car.

13. In an elevator-control system, an elevator car operable in a hatchway past a landing, a motor for driving said car, a generator, electrical connections between the armatures of said motor and said generator, controlling means for varying the excitation of said generator to control the rate of decrease of the counter-electromotive force of said motor while the car is approaching said landing and is in a predetermined region in advance of said landing, in order to stop said car at said landing, and means for modifying the operation of said controlling means to correct for variations in the ratio between the counter-electromotive force and speed of said motor in response to operation of said controlling means is independent of the load on said elevator car.

14. In an elevator-control system, an elevator car, a motor for driving said car, a generator, electrical connections between the armatures of said motor and said generator, means responsive to the counter-electromotive force of said motor for controlling the excitation of said generator to maintain the counter-electromotive force of said motor constant regardless of motor load, means for controlling said first-mentioned means to cause the counter-electromotive force of said motor to assume a succession of different predetermined values at the expiration of predetermined intervals of time, thereby controlling the rate of change of counter-electromotive force of said motor, and means responsive to the current in said connections for modifying the operation of said last-mentioned means to cause the rates of change of speed of said motor determined by operation of said last-mentioned means to be substantially the same for all values of load on said car.

15. In an elevator-control system, an elevator car operable in a hatchway past a landing, a motor for driving said car, a generator, electrical connections between the armatures of said motor and said generator, means responsive to the counter-electromotive force of said motor for controlling the excitation of said generator to maintain the counter-electromotive force of said motor constant regardless of motor load, means for controlling said first-mentioned means to cause the counter-electromotive force of said motor to assume a succession of decreasing predetermined values at the expiration of predetermined intervals of time after said car has passed a predetermined point in the hatchway in advance of said landing, in approaching said landing, and means responsive to the current in said connections for modifying the operation of said last-mentioned means to cause the rates of change of speed of said motor determined by operation of said last-mentioned means to be substantially the same for all values of load on said car.

16. In an elevator-control system, an elevator car operable in a hatchway past a landing, a motor for driving said car, a generator, electrical connections between the armatures of said motor and said generator, a high-speed switch for determining, when operated, the excitation of said generator at a value corresponding to a high motor speed, a first means for initiating slow down of said car at a point, a predetermined distance in advance of said landing, when said high-speed switch is operated, a second means for initiating slow down of said car at a second point, a different predetermined distance in advance of said landing, when said high-speed switch is not operated, deceleration means responsive to operation of said first or second means for controlling the excitation of said generator to decelerate said motor in order to stop said car at said landing, means responsive to current in said connections for modifying the operation of said deceleration means to cause said motor to decelerate in substantially the same manner with all car loads, and means for changing the sensitiveness of said last-mentioned means when said high-speed switch is operated.

17. In an elevator-control system, an elevator car operable in a hatchway past a landing, a motor for driving said car, a generator, electrical connections between the armatures of said motor and said generator, a high-speed switch for determining, when operated, the excitation of said generator at a value corresponding to a high motor speed, a first means for initiating slow down of said car at a point a predetermined distance in advance of said landing when said high-speed switch is operated, a second means for initiating slow down of said car at a second point, a different predetermined point in advance of said landing, when said high-speed switch is not operated, deceleration means responsive to operation of said first or second means for controlling the excitation of said generator to cause the counter-electromotive force of said motor to assume a succession of decreasing predetermined values at the expiration of predetermined intervals of time, thereby determining the rate of change of counter-electromotive force of said motor, means responsive to current in said connections for modifying the operation of said deceleration means to cause the rates of change of speed of said motor determined by said deceleration means to be the same for all car loads when operation of said deceleration means has been initiated by said first means, and the same for all car loads when the operation of said deceleration means has been initiated by said second means, and means for changing the sensitiveness of said last-mentioned means when said high-speed switch is operated.

In testimony whereof, I have hereunto subscribed my name this 17th day of July, 1930.

WILLIAM F. EAMES.